United States Patent [19]

Loffelman

[11] 4,348,493

[45] Sep. 7, 1982

[54] NOVEL LIGHT STABILIZERS FOR POLYMERS

[75] Inventor: Frank F. Loffelman, Bridgewater, N.J.

[73] Assignee: American Cyanamid Company, Stamford, Conn.

[21] Appl. No.: 284,885

[22] Filed: Jul. 20, 1981

[51] Int. Cl.³ .................. C07D 401/12; C07D 401/14; C08K 5/34

[52] U.S. Cl. ..................................... 524/100; 544/113; 544/198; 544/209; 544/212; 544/219

[58] Field of Search ................ 260/45.8 NT; 544/113, 544/198, 209, 212, 219

[56] References Cited

U.S. PATENT DOCUMENTS

| | | | |
|---|---|---|---|
| 4,028,334 | 6/1977 | Chalmers et al. | 544/198 |
| 4,108,829 | 8/1978 | Cassandrini et al. | 544/212 |
| 4,141,883 | 2/1979 | Soma et al. | 544/219 |
| 4,161,592 | 7/1979 | Evans et al. | 544/212 |
| 4,191,683 | 3/1980 | Brunetti et al. | 544/212 |
| 4,234,728 | 11/1980 | Rody et al. | 544/198 |
| 4,288,593 | 9/1981 | Rody | 544/212 |
| 4,294,963 | 10/1981 | Rody | 544/212 |

*Primary Examiner*—John Kight, III
*Assistant Examiner*—R. A. White
*Attorney, Agent, or Firm*—Bruce F. Jacobs

[57] ABSTRACT

Ultraviolet light stabilizers for polymers are disclosed. The stabilizers have the formula

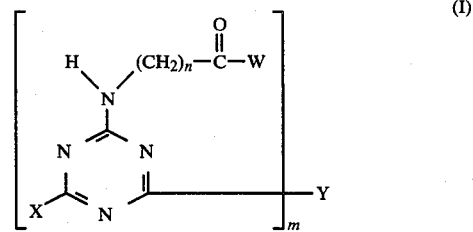

(I)

15 Claims, No Drawings

NOVEL LIGHT STABILIZERS FOR POLYMERS

This invention relates to novel compounds, containing 1,3,5-triazine rings and a hindered piperidinyl moiety, which are useful for improving the stability of polymeric substances to ultraviolet radiation. More particularly, the invention relates to novel compounds of formula (I)

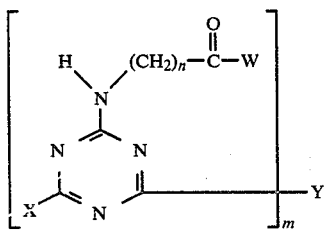

wherein W represents $C_1$–$C_{20}$ alkoxy, or

wherein R and $R^1$, are the same or different and each represent hydrogen, $C_1$–$C_{20}$ alkyl, or together form a piperidino, pyrrolidyl, or morpholino radical; n is an integer from 1 to 3; and m is an integer from 1 to 6.

When m is 1, X and Y, are the same or different and each represent chloro, bromo,

wherein R and $R^1$ are as previously defined, $C_1$–$C_{12}$ alkoxy, $C_1$–$C_{12}$ alkylthio,

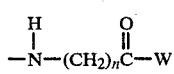

wherein n and W are as previously defined, or the radicals (II) or (III)

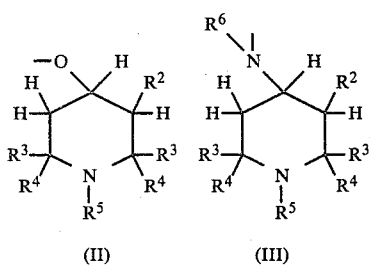

wherein $R^2$ represents hydrogen, $C_1$–$C_8$ alkyl, or benzyl; $R^3$ and $R^4$ independently represent $C_1$–$C_8$ alkyl, benzyl, or phenethyl, or together with the carbon to which they are attached form a $C_5$–$C_{10}$ cycloalkyl; $R^5$ represents hydrogen, $C_2$–$C_3$ hydroxyalkyl, $C_1$–$C_8$ alkyl, hydroxyl, or oxyl; $R^6$ represents hydrogen, $C_1$–$C_{20}$ alkyl, or the radical (IV)

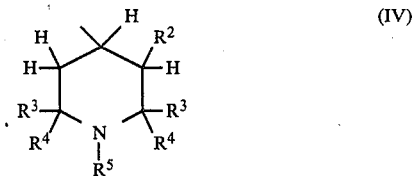

wherein $R^2$, $R^3$, $R^4$, and $R^5$ are as previously defined; with the proviso that at least one X or Y, must contain a piperidinyl moiety (IV).

When m is an integer from 2 to 6, X is as previously defined; Y is an m-valent radical derived from a polyamine, polyalcohol, or polymercaptan containing a $C_2$–$C_{20}$ alkylene chain, either straight-chained or branched, wherein the alkylene chain may be interrupted by oxy, thio, or

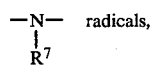

wherein $R^7$ represents hydrogen, $C_1$–$C_{20}$ alkyl, or the moiety (IV); $C_5$–$C_{10}$ cycloalkylene,

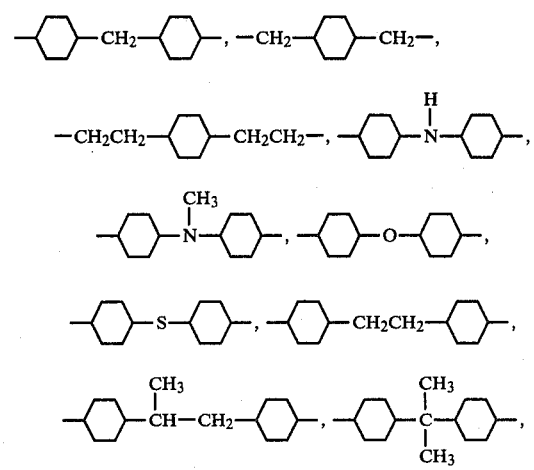

$C_6$–$C_{12}$ arylene; or $C_8$–$C_{14}$ arylenedialkylene; with the proviso that at least one piperidinyl moiety (IV) is present in X or Y.

This invention also relates to the use of such compounds for stabilizing polymers, particularly polyolefins, against degradation by ultraviolet radiation, and to the stabilized compositions thereby obtained.

The preferred compounds of this invention are represented by formulas (V) and (VI)

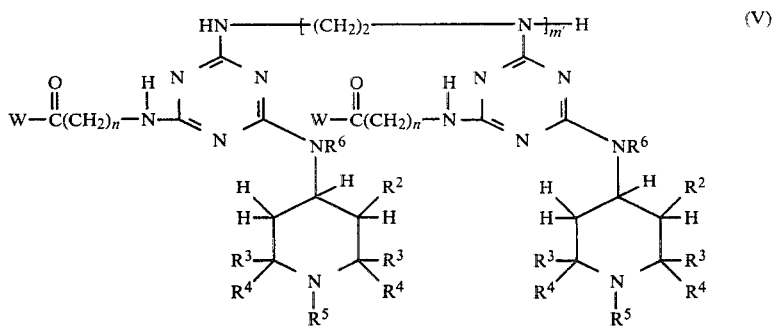

(V)

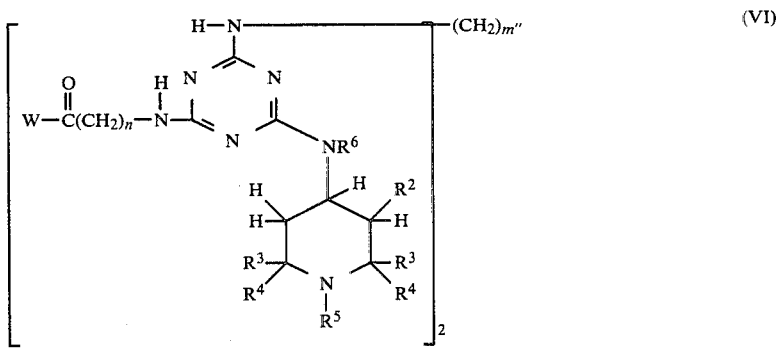

(VI)

wherein W, n, $R^2$, $R^3$, $R^4$, $R^5$, and $R^6$ are as previously defined, m' is an integer from 2 to 4, and m" is an integer from 2 to 6.

The especially preferred compounds are those compounds of formulas (V) and (VI) wherein $R^2$, $R^5$, and $R^6$ are hydrogen, and $R^3$ and $R^4$ are methyl.

U.S. Pat. No. 2,544,071 discloses bridged 1,3,5-triazines, more particularly alkylene melamines.

U.S. Pat. Nos. 3,925,376 and 4,028,334 disclose highly alkylated 4-piperidinyl-substituted 1,3,5-triazines which are useful for stabilizing polymers against photodegradation.

U.S. Pat. No. 4,110,304 discloses stabilizing systems comprising highly alkylated 4-piperidinyl-substituted 1,3,5-triazines (col. 16, lines 48–53) and a costabilizer.

U.S. Pat. No. 4,108,829 discloses piperidinyl-substituted compounds produced by reacting a substituted halotriazine with a polyamine.

It is well-known that sunlight and other sources of ultraviolet radiation cause degradation of polymers as evidenced by embrittlement or yellowing of plastic articles made therefrom. It is also well-known that this degradation can be inhibited by use of ultraviolet light stabilizers incorporated in or on such articles. Various additives, used alone or in combinations, have been suggested to inhibit such light degradation in order to prolong the useful lives of articles made from polymers. Since none has been found to be completely satisfactory, research continues in order to find compounds, or combinations of compounds, which will be more satisfactory. The present invention arose out of such research and resulted in the discovery of novel compounds which stabilize polymers against degradation by ultraviolet light.

The stabilizers of the present invention offer the following advantages:
(1) excellent light-stabilizing activity,
(2) excellent compatibility with resins,
(3) low volatility,
(4) low extractability from polymers by laundering or dry cleaning, and
(5) excellent oven-aging stability.

The compounds of formula (I) wherein m is 1 may be prepared by reacting a compound of formula (VII) or (VIII)

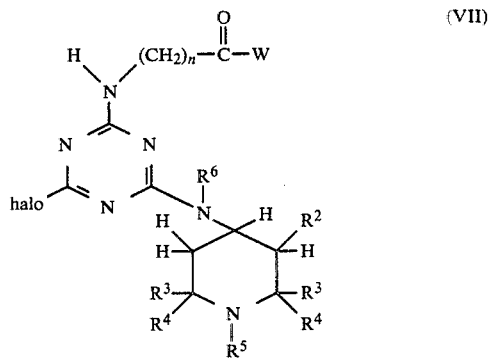

(VII)

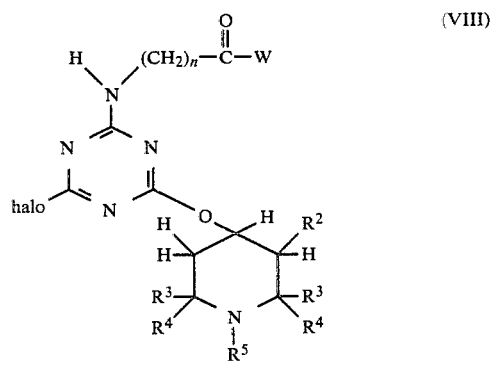

(VIII)

wherein halo represents bromo, or chloro, and W, n, $R^2$, $R^3$, $R^4$, $R^5$, and $R^6$ are as previously defined, with a suitable amine, alcohol, or mercaptan in an inert solvent, such as acetone, in the presence of a suitable base, such as potassium hydroxide, sodium bicarbonate, sodium carbonate, and the like, at about 40° C. to obtain the desired product, which is subsequently recovered by conventional methods, washed with water, and dried.

Illustrative examples of compounds of formula (I) wherein m is 1 include the following:
2-bromo-4-(2,2,6,6-tetramethyl-4-piperidinyl)amino-6-ethoxycarbonylmethyleneamino-1,3,5-triazine,
2-chloro-4-(1,2,2,6,6-pentamethyl-4-piperidinyl)amino-6-n-butoxycarbonylmethyleneamino-1,3,5-triazine,
2-methoxy-4-(2,2,6,6-tetraethyl-4-piperidinyl)amino-6-methoxycarbonylethyleneamino-1,3,5-triazine,
2-methylthio-4-(2,2,6,6-tetrabutyl-4-piperidinyl)amino-6-n-hexyloxytrimethyleneamino-1,3,5-triazine,
2-(2-ethylhexyl)amino-4-(1-oxyl-2,2,6,6-tetramethyl-4-piperidinyl)-amino-6-octadecyloxymethyleneamino-1,3,5-triazine,
2-amino-4-(2,2,3,6,6-pentamethyl-4-piperidinyl)amino-6-aminocarbonylmethyleneamino-1,3,5-triazine,
2,4-bis[(2,2,6,6-tetramethyl-4-piperidinyl)amino]-6-morpholinocarbonylmethyleneamino-1,3,5-triazine,
2,4-bis(ethoxycarbonylmethyleneamino)-6-(2,2,6,6-tetramethyl-4-piperidinyl)amino-1,3,5-triazine,
2,4-bis[(2,2,6,6-tetramethyl-4-piperidinyl)amino]-6-methoxycarbonylmethyleneamino-1,3,5-triazine,
2-dimethylamino-4-(2,2,6,6-tetramethyl-4-piperidinyl)amino-6-dimethylaminocarbonylmethyleneamino-1,3,5-triazine,
2-piperidino-4-[1-(2-hydroxyethyl)-2,2,6,6-tetramethyl-4-piperidinyl]amino-6-ethoxycarbonylmethyleneamino-1,3,5-triazine,
2-pyrrolidyl-4-(2,2,6,6-tetramethyl-4-piperidinyl)amino-6-ethoxycarbonylethyleneamino-1,3,5-triazine,
2,4-bis[(2,2,6,6-tetramethyl-4-piperidinyl)amino]-6-piperidinocarbonylmethyleneamino-1,3,5-triazine,
2,4-bis[(2,2,6,6-tetramethyl-4-piperidinyl)amino]-6-pyrrolidylcarbonylmethyleneamino-1,3,5-triazine,
2-chloro-4-(2,2,6,6-tetramethyl-4-piperidinyl)oxy-6-ethoxycarbonylmethyleneamino-1,3,5-triazine,
2-methoxy-4-(2,2,6,6-tetraethyl-4-piperidinyl)oxy-6-n-hexyloxycarbonyltrimethyleneamino-1,3,5-triazine,
2,4-bis(2,2,6,6-tetramethyl-4-piperidinyl)oxy-6-dodecyloxycarbonylmethyleneamino-1,3,5-triazine,
2-(2-ethylhexyl)amino-4-(2,2,3,6,6-pentamethyl-4-piperidinyl)oxy-6-morpholinocarbonylmethyleneamino-1,3,5-triazine,
2,4-tetrakis[(2,2,6,6-tetramethyl-4-piperidinyl)amino]-6-ethoxycarbonylmethyleneamino-1,3,5-triazine,
and the like.

The compounds of formula (I) wherein m is 2 to 6 may be prepared by reacting a compound of formula (VII) or (VIII), with a suitable diamine, polyamine, diol, polyol, dithiol, or polythiol in an inert medium in the presence of a suitable base, as described above. Various compounds may be prepared by varying the amount of the compound of formula (VII) or (VIII). Optionally, the piperidinyl moiety may be present in the diamine, polyamine, diol, polyol, dithiol, or polythiol reactant. In the latter case the piperidinyl-containing reactant is reacted with a 1,3,5-triazine of formula (IX)

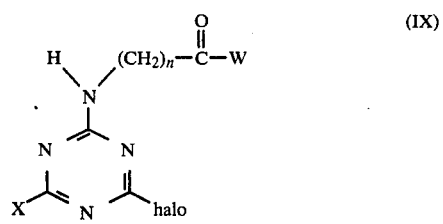

wherein halo represents bromo or chloro, and X, W, and n are as previously defined.

Illustrative examples of compounds of formula (I) wherein m is 2 to 6 include the following:
1,4,7-tris[4-ethoxycarbonylmethyleneamino-6-(2,2,6,6-tetramethyl-4-piperidinyl)amino-1,3,5-triazin-2-yl]-1,4,7-triazaheptane,
1,8-bis[4-ethoxycarbonylmethyleneamino-6-(2,2,6,6-tetramethyl-4-piperidinyl)-amino-1,3,5-triazin-2-yl]-1,8-diazaoctane,
1,8-bis[4-methoxycarbonyltrimethyleneamino-6-(2,2,3,6,6-pentamethyl-4-piperidinyl)oxy-1,3,5-triazin-2-yl]-1,8-diazaoctane,
1,8-bis[4-n-hexyloxycarbonylmethyleneamino-6-(2,2,6,6-tetramethyl-4-piperidinyl)amino-1,3,5-triazin-2-yl]-1,8-dioxaoctane,
1,7-bis[4-ethoxycarbonylmethyleneamino-6-(1,2,2,6,6-pentamethyl-4-piperidinyl)amino-1,3,5-triazin-2-yl]-1,7-dioxa-4-azaheptane,
1,7-bis[4-aminocarbonylmethyleneamino-6-(2,2,6,6-tetramethyl-4-piperidinyl)-amino-1,3,5-triazin-2-yl]-4-oxa-1,7-diazaheptane,
1,8-bis[4-dimethylaminocarbonylmethyleneamino-6-(2,2,6,6-tetramethyl-4-piperidinyl)amino-1,3,5-triazin-2-yl]-1,8-dithiaoctane,
1,4,7-tris[4-morpholinocarbonylmethyleneamino-6-(2,2,6,6-tetramethyl-4-piperidinyl)amino-1,3,5-triazin-2-yl]-1,4,7-triazaheptane,
1,8-bis[4-piperidinocarbonylmethyleneamino-6-(1-oxyl-2,2,6,6-tetramethyl-4-piperidinyl)amino-1,3,5-triazin-2-yl]-1,8-diazaoctane,
1,4-bis[4-pyrrolidylcarbonylmethyleneamino-6-(2-benzyl-2,6,6-trimethyl-4-piperidinyl)amino-1,3,5-triazin-2-yl]-1,4-dioxabutane,
1,7-bis[4-morpholinocarbonylmethyleneamino-6-(2,2,6,6-tetramethyl-4-piperidinyl)oxy-1,3,5-triazin-2-yl]-1,4,7-triazaheptane,
and the like.

The compounds of this invention are useful as light stabilizers for thermoplastic substrates such as polyolefins, polyesters, polyethers, polyurethanes, polystyrenes, high-impact polystyrenes, and the like. Preferably, the thermoplastic substrate is a polyolefin.

Other organic materials susceptible to degradation by the effects of light, the properties of which are improved by the incorporation therein of a compound of this invention, include natural and synthetic rubbers; the latter include, for example, homo-, co-, and terpolymers of acrylonitrile, butadiene and styrene, and blends thereof.

The compounds of formula (I) are particularly useful in polyolefins, such as polyethylene, polypropylene, polybutylene, and the like, and copolymers thereof.

Generally, the compositions comprise a polymer containing from about 0.1% to about 5% by weight of the compound of formula (I), based on the weight of the polymer.

Preferably, the composition comprises a polyolefin containing from about 0.2% to about 2% by weight of the compound of formula (I), based on the weight of the polyolefin.

Optionally, the compositions may contain other additives, especially additives useful in polyolefins, such as antioxidants, supplemental light stabilizers, plasticizers, flame retardants, antistatic and antislipping agents, fillers, dyes, pigments, and the like.

Suitable antioxidants include those of the hindered phenol type, such as 2,6-di-t-butyl-p-cresol; 4,4'-bis(2,6-di-t-butylphenol); 4,4'-bis(2,6-diisopropylphenol); 2,4,6-tri-t-butylphenol; 2,2'-thiobis(4-methyl-6-t-butylphenol); octadecyl 2(3',5'-di-t-butyl-4'hydroxyphenyl)-propionate, etc; esters of thiodipropionic acid, such as dilauryl thiodipropionate and distearyl thiodipropionate, etc; hydrocarbyl phosphites, such as triphenyl phosphite, trinonyl phosphite, diisodecyl pentaerythrityl diphosphite, diphenyldecyl phosphite, etc; and combinations thereof.

Suitable supplemental light stabilizers include those of the benzotriazole class, such as 2-(2'-hydroxy-5-t-octylphenyl)benzotriazole; 2-(2'-hydroxy-3'-5'-di-tbutylphenyl)-5-chlorobenzotriazole; those of the hydroxybenzophenone type, such as 2-hydroxy-4-methoxybenzophenone; 2-hydroxy-4-octyloxybenzophenone; 2,2'-dihydroxy-4,4'-dimethoxybenzophenone; hindered phenol esters, such as n-hexadecyl 3,5-di-t-butyl-4-hydroxybenzoate, and -2',4'-di-t-butylphenyl 3,5-di-t-butyl-4-hydroxybenzoate; metal complexes, such as nickel complexes of 2,2'-thiobis(4-t-octylphenol); nickel butylamine complex of 2,2'-thiobis(4-t-octylphenol); nickel complexes of bis(4-toctylphenyl)sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc; nickel complex of 2-hydroxy-4-methylphenyl undecyl ketone oxime, etc. Further illustrative examples of suitable antioxidants and supplemental light stabilizers can be found in columns 3 and 4 of U.S. Pat. Nos. 3,488,290 and 3,496,134 and in the other patents mentioned therein.

As with the compound of formula (I), the additive is advantageously employed within the range from about 0.2% to about 2% by weight, based on the weight of the untreated polymer.

The compound of formula (I) may be incorporated into the polymeric substrate by any of the known techniques for compounding additives with a polymer. For example, the compound of formula (I) and the additive may be compounded by dry blending with the substrate in powder or granular form, followed by milling, Banbury mixing, molding, casting, extruding, swelling, and the like. Alternatively, the compound of formula (I) may be added, as a solution or slurry in a suitable inert solvent, or dispersant, to the polymeric substrate in powder or granular form, the whole mixed intimately in a mixer, and the solvent subsequently removed. As a further possibility, the compound of formula (I) may be added to the polymeric substrate during the preparation of the latter, for instance at the latex stage of polymer production, to provide prestabilized polymer material.

The following examples illustrate the present invention. All parts and percentages are by weight unless otherwise indicated.

EXAMPLE 1

Preparation of 1,8-Bis[4-ethoxycarbonylmethyleneamino-6-(2,2,6,6-tetramethyl-4-piperidinyl)amino-1,3,5-triazin-2-yl]-1,8-diazaoctane

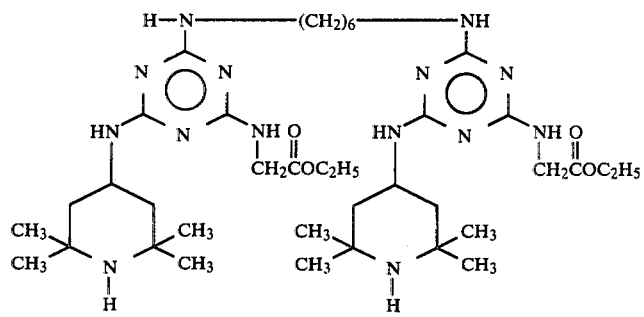

2,4-Dichloro-6-ethoxycarbonylmethyleneamino-1,3,5-triazine (12.5 grams; 0.05 mole), dissolved in toluene (200 mls), is treated with 4-amino-2,2,6,6-tetramethylpiperidine (7.8 grams; 0.05 mole) and powdered sodium hydroxide (2.0 grams; 0.05 mole) and the mixture is stirred at 40° C. for 3 hours. At this point, powdered sodium hydroxide (2.0 grams; 0.05 mole) and hexamethylenediamine (2.9 grams; 0.025 mole) are added and the mixture is heated at reflux for 8 hours. The reaction mixture is filtered and the filtrate is heated under vacuum to remove the solvent. The resulting residue is the desired product.

EXAMPLE 2

Preparation of
1,4,7-Tris[4-ethoxycarbonylmethyleneamino-6-(2,2,6,6-tetramethyl-4-piperidinyl)amino-1,3,5-triazin-2-yl]-1,4,7-triazaheptane

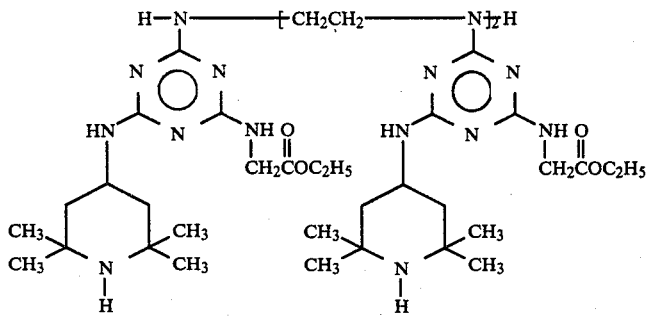

1,4,7-Tris(4,6-dichloro-1,3,5-triazin-2-yl)-1,4,7-triazaheptane (16.4 grams; 0.03 mole) is slurried in a rapidly stirred mixture of cold (0°–5° C.) water and acetone (25 mls), and 4-amino-2,2,6,6-tetramethylpiperidine (14.0 grams; 0.09 mole) is added thereto. The mixture is warmed to 30° C. and a solution of sodium carbonate (9.6 grams; 0.09 mole) in water (30 mls) is added gradually. The temperature of the reaction mixture is gradually raised to 40°–50° C. and held thereat for 2 hours. The reaction mixture is cooled to ambient temperature and filtered to recover the solid precipitate. The solid is pulverized, washed with water and dried in a vacuum oven to obtain a crude intermediate product.

The crude intermediate from above is dissolved in ethyl glycinate (100 mls) and the mixture is stirred and heated at reflux for 3 hours. The reaction mixture is then filtered and the filtrate is heated under vacuum to strip off the ethyl glycinate. The residue is then rinsed with water and dried under vacuum to obtain the desired product.

EXAMPLE 3

Preparation of
1,4,7,10,13-Pentakis[4-ethoxycarbonylmethyleneamino-6-(2,2,6,6-tetramethyl-4-piperidinyl)amino-1,3,5-triazin-2-yl]-1,4,7,10,13-pentaazatridecane

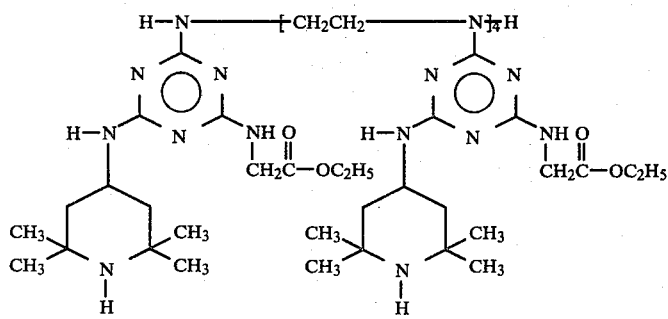

Cyanuric chloride (9.20 grams; 0.05 mole), dissolved in acetone (30 mls), is added slowly to rapidly stirred ice water (150 mls) at 0°–5° C. To the resulting slurry is added tetraethylenepentamine (1.89 grams; 0.01 mole) while maintaining the reaction temperature below 5° C. When the addition is completed, sodium carbonate (5.1 grams; 0.05 mole) is added and the mixture is stirred for one hour at 0°–5° C. The mixture is then warmed to room temperature and 4-amino-2,2,6,6-tetramethylpiperidine (7.80 grams; 0.05 mole) is added thereto. The mixture is then heated to 45° C. and held thereat for one hour. Additional sodium carbonate (5.3 grams; 0.05 mole) is added and the mixture is heated at 45° C. for an additional 0.5 hour. Ethyl glycine (5.16 grams; 0.05 mole) is added to the mixture and the mixture is slowly heated to 90° C. At this point, sodium carbonate (5.3 grams; 0.05 mole) is added and the mixture is heated at reflux for 2 hours. The mixture is allowed to cool slowly to room temperature and the insoluble product is recovered by filtration, washed with water, and dried.

The product, with ethyl glycine (4.15 grams; 0.04 mole), and powdered sodium hydroxide (1.44 grams), is heated at reflux in toluene (200 mls) while stirring for 5 hours.

At this point, ethyl glycine (3 grams) is added and the mixture is refluxed for 6 hours. The mixture is then filtered and the filtrate is treated with sodium carbonate (3 grams) and a filter aid, and filtered again. The clear filtrate is heated under a vacuum to strip off the toluene and unreacted ethyl glycine and the residue is powdered to obtain the desired product.

EXAMPLES 4-6

Testing in Polypropylene

The products of Examples 1–3 (0.25 gram) are separately dry blended with a mastermix of 100 grams of unstabilized polypropylene (Pro-fax ®6401) and 0.1 gram of a processing antioxidant, 2,4,6-tri-t-butylphenol. The blend is milled at 350°–370° F. for five minutes, and then compression molded at 400° F. into a film 4–5 mils thick. The film and a control film, identically prepared without the compound under test, are exposed to a xenon arc in an Atlas Weather-Ometer ® until they fall. A film is considered as having failed when the carbonyl content of the infrared absorption spectrum increases by 0.10—weight percent, a generally accepted point of film embrittlement.

The compounds under test show a significant increase in the number of hours required to increase the carbonyl content by 0.1% by weight versus the control film.

What is claimed is:

1. A compound of the formula (I)

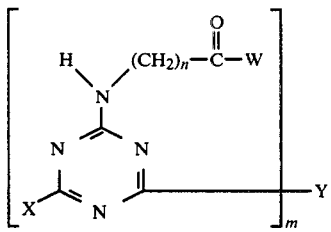

wherein W represents $C_1$–$C_{20}$ alkoxy, or

wherein R and $R^1$ are the same or different and each represent hydrogen, $C_1$–$C_{20}$ alkyl, or together form a piperidino, pyrrolidyl, or morpholino radical; n is an integer from 1 to 3; and m is an integer from 1 to 6;

when m is 1, X and Y are the same or different and each represent chloro, bromo,

wherein R and $R^1$ are as previously defined, $C_1$–$C_{12}$ alkoxy, $C_1$–$C_{12}$ alkylthio,

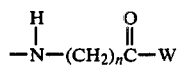

wherein n and W are as previously defined, or the radicals (II) or (III)

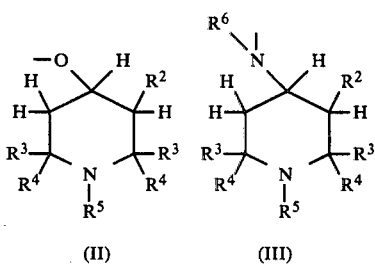

wherein $R^2$ represents hydrogen, $C_1$–$C_8$ alkyl, or benzyl; $R^3$ and $R^4$ independently represent $C_1$–$C_8$ alkyl, benzyl, or phenethyl, or together with the carbon to which they are attached form a $C_5$–$C_{10}$ cycloalkyl; $R^5$ represents hydrogen, $C_2$–$C_3$ hydroxyalkyl, $C_1$–$C_8$ alkyl, hydroxyl, or oxyl; $R^6$ represents hydrogen, $C_1$–$C_{20}$ alkyl, or the radical (IV)

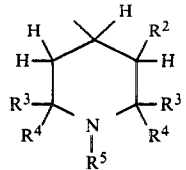

wherein $R^2$, $R^3$, $R^4$, and $R^5$ are as previously defined; with the proviso that at least one X or Y, must contain a piperidinyl moiety (IV); and when m is an integer from 2 to 6, X is as previously defined; Y is an m-valent radical derived from a polyamine, polyalcohol, or polymercaptan containing a $C_2$–$C_{20}$ alkylene chain, either straight-chained or branched, wherein the alkylene chain may be interrupted by oxy, thio, or

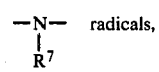 radicals, wherein $R^7$ represents hydrogen, $C_1$–$C_{20}$ alkyl, or the moiety (IV); $C_5$–$C_{10}$ cycloalkylene,

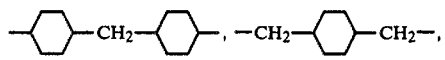

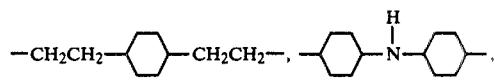

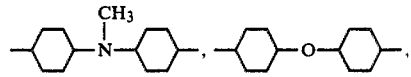

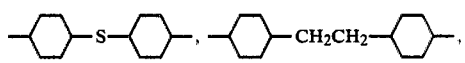

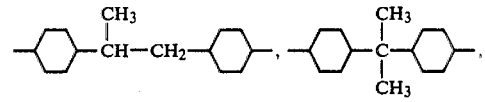

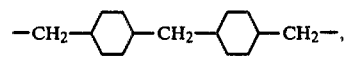

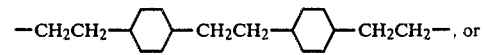

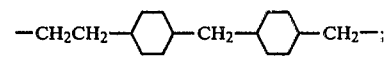

$C_6$–$C_{12}$ arylene; or $C_8$–$C_{14}$ arylenedialkylene; with the proviso that at least one piperidinyl moiety (IV) is present in X or Y.

2. The compound of claim 1 of the formula (V)

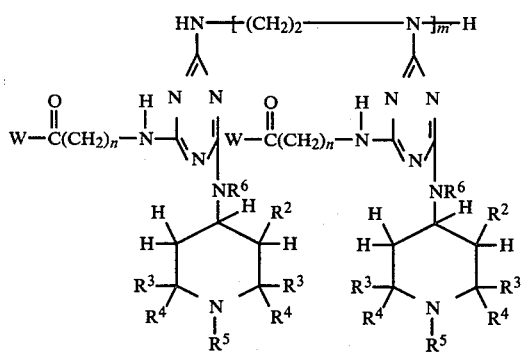

wherein m' is an integer from about 2 to 4.

3. The compound of claim 2 wherein $R^2$, $R^5$ and $R^6$ are hydrogen, and $R^3$ and $R^4$ are methyl.

4. The compound of claim 1 of the formula (VI)

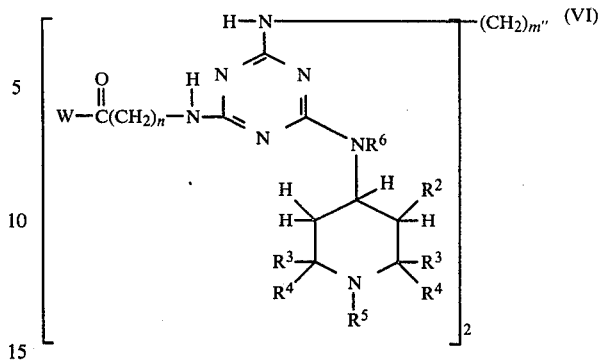

wherein m" is an integer from about 2 to 6.

5. The compound of claim 4 wherein $R^2$, $R^5$ and $R^6$ are hydrogen, and $R^3$ and $R^4$ are methyl.

6. The compound of claim 1: 1,8-bis[4-ethoxycarbonylmethyleneamino-6-(2,2,6,6-tetramethyl-4-piperidinyl)amino-1,3,5-triazin-2-yl]-1,8-di-azaoctane.

7. The compound of claim 1: 1,4,7-tris[4-ethoxy-carbonylmethyleneamino-6-(2,2,6,6-tetramethyl-4-piperidinyl)amino-1,3,5-triazin-2-yl]-1,4,7-triazaheptane.

8. The compound of claim 1: 1,4,7,10,13-pentakis-[4-ethoxycarbonylmethyleneamino-6-(2,2,6,6-tetramethyl-4-piperidinyl)amino-1,3,5-triazin-2-yl]-1,4,7,10,13-pentaazatridecane.

9. A method for stabilizing a polymer which is normally subject to degradation by ultraviolet radiation which comprises incorporating into said polymer an ultraviolet stabilizingly effective amount of a compound of claim 1.

10. The method of claim 9 wherein the compound is incorporated in a concentration of from about 0.2 to 2% by weight based on the weight of the polymer.

11. The method of claim 9 wherein the polymer is a polyolefin.

12. The method of claim 11 wherein the polyolefin is polypropylene.

13. The method of claim 9 wherein the compound is that of claim 2, 3, 4, 5, 6, 7 or 8.

14. The composition produced by the method of claim 9, 10, 11 or 12.

15. The composition produced by the method of claim 13.

* * * * *